(12) United States Patent
Song et al.

(10) Patent No.: US 8,601,189 B2
(45) Date of Patent: Dec. 3, 2013

(54) METHOD FOR PROCESSING INFORMATION OF AN OBJECT FOR PRESENTATION OF MULTIPLE SOURCES

(75) Inventors: Yu Kyoung Song, Gyeonggi-do (KR); Kyung Ju Lee, Gyeonggi-do (KR); Chang Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/162,116

(22) PCT Filed: Nov. 30, 2006

(86) PCT No.: PCT/KR2006/005124
§ 371 (c)(1),
(2), (4) Date: Nov. 24, 2008

(87) PCT Pub. No.: WO2007/086644
PCT Pub. Date: Aug. 2, 2007

(65) Prior Publication Data
US 2009/0083462 A1  Mar. 26, 2009

Related U.S. Application Data

(60) Provisional application No. 60/763,032, filed on Jan. 27, 2006.

(51) Int. Cl.
*G06F 13/42* (2006.01)
*G06F 15/16* (2006.01)
*H04N 7/173* (2011.01)

(52) U.S. Cl.
USPC .......................... 710/105; 709/219; 725/113

(58) Field of Classification Search
USPC ........... 710/10, 21, 33, 58, 61, 104, 105, 110; 709/218, 219, 232; 725/87, 110, 112, 725/113
See application file for complete search history.

(56) References Cited

U.S. PATENT DOCUMENTS

| | | | | |
|---|---|---|---|---|
| 5,778,181 A * | 7/1998 | Hidary et al. | ................. | 725/110 |
| 6,490,627 B1 * | 12/2002 | Kalra et al. | .................... | 709/231 |
| 6,832,241 B2 * | 12/2004 | Tracton et al. | ................ | 709/203 |
| 7,010,492 B1 * | 3/2006 | Bassett et al. | ..................... | 705/1 |
| 7,376,907 B2 * | 5/2008 | Santoro et al. | ................ | 715/765 |
| 7,409,437 B2 * | 8/2008 | Ullman et al. | ................ | 709/219 |
| 7,664,872 B2 * | 2/2010 | Osborne et al. | ............... | 709/232 |
| 7,739,411 B2 * | 6/2010 | Messer et al. | ................. | 709/248 |
| 7,849,222 B2 * | 12/2010 | Han et al. | ...................... | 709/248 |
| 2002/0156909 A1 * | 10/2002 | Harrington | .................. | 709/231 |
| 2002/0178279 A1 * | 11/2002 | Janik et al. | .................... | 709/231 |
| 2002/0194309 A1 * | 12/2002 | Carter et al. | .................. | 709/219 |
| 2003/0229900 A1 * | 12/2003 | Reisman | ........................ | 725/87 |
| 2004/0221056 A1 * | 11/2004 | Kobayashi | .................... | 709/232 |
| 2005/0021866 A1 * | 1/2005 | Kang et al. | .................... | 709/248 |
| 2005/0055352 A1 * | 3/2005 | White et al. | .................... | 707/10 |

(Continued)

*Primary Examiner* — Khanh Dang
(74) *Attorney, Agent, or Firm* — Lee, Hong, Degerman, Kang & Waimey

(57) ABSTRACT

In case that a main component and an auxiliary component to be presented in synchronization with the main one have to be presented through data transmission between both devices, the present invention issues an action for setting access location information (e.g., URL) of at least one auxiliary component to a media renderer, wherein the action is different from an action for setting access location information of a main component. As a different way, the present invention sets access location information of at least one auxiliary component to a media renderer through an action including access location information of an auxiliary component as well as access location information of a main component.

12 Claims, 9 Drawing Sheets

(56) References Cited

U.S. PATENT DOCUMENTS

| | | | |
|---|---|---|---|
| 2005/0080915 A1* | 4/2005 | Shoemaker et al. | 709/231 |
| 2006/0047844 A1* | 3/2006 | Deng | 709/231 |
| 2006/0161635 A1* | 7/2006 | Lamkin et al. | 709/217 |
| 2007/0143370 A1* | 6/2007 | Bushmitch et al. | 707/204 |
| 2007/0192512 A1* | 8/2007 | Kwon et al. | 709/248 |
| 2007/0192818 A1* | 8/2007 | Bourges-Sevenier et al. | 725/132 |
| 2007/0239864 A1* | 10/2007 | Kwon et al. | 709/223 |
| 2009/0248713 A1* | 10/2009 | Park et al. | 707/100 |
| 2009/0319479 A1* | 12/2009 | Min et al. | 707/3 |
| 2010/0063970 A1* | 3/2010 | Kim | 707/741 |
| 2010/0287463 A1* | 11/2010 | Lee | 715/243 |

* cited by examiner

- Prior Art -

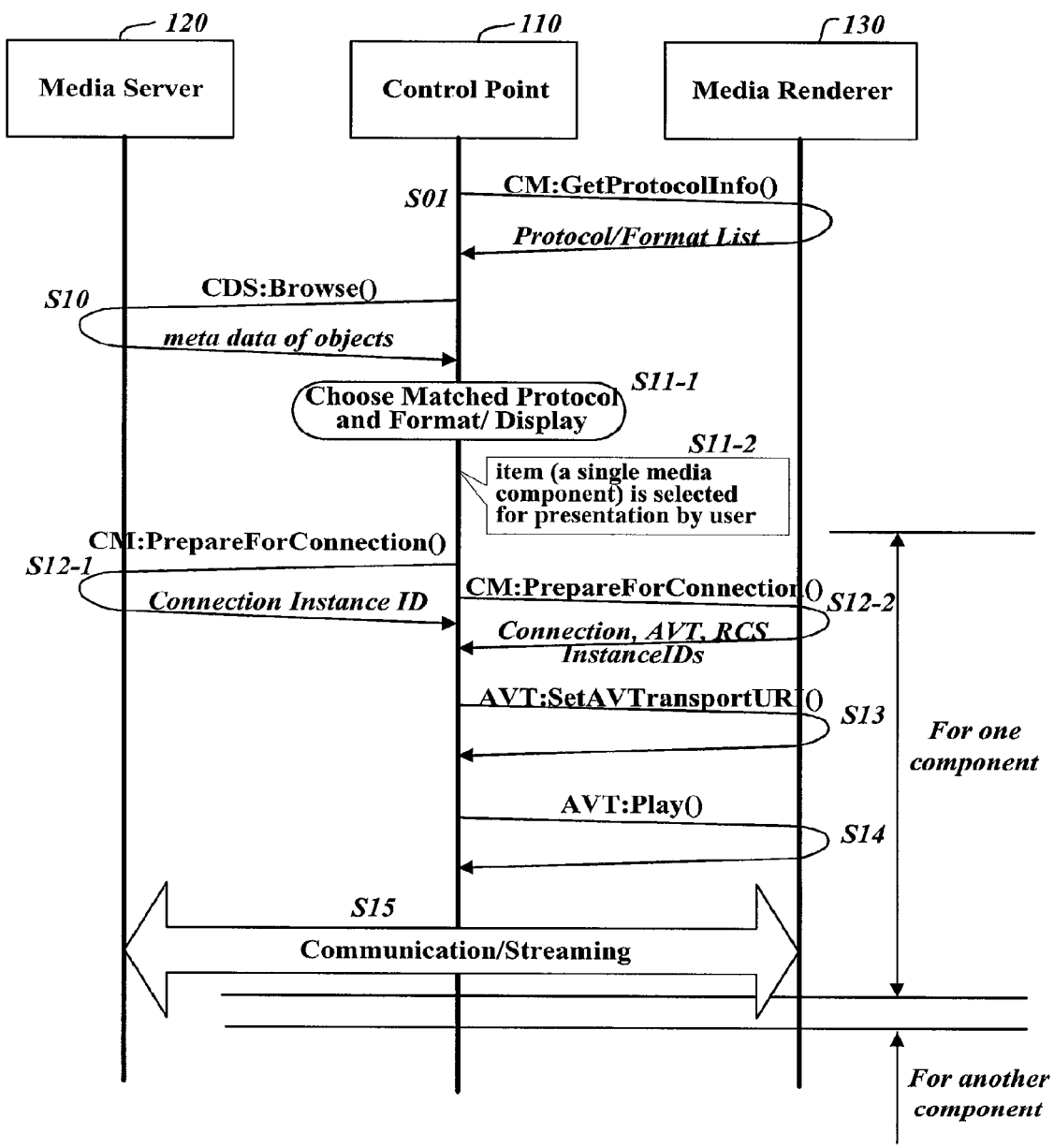

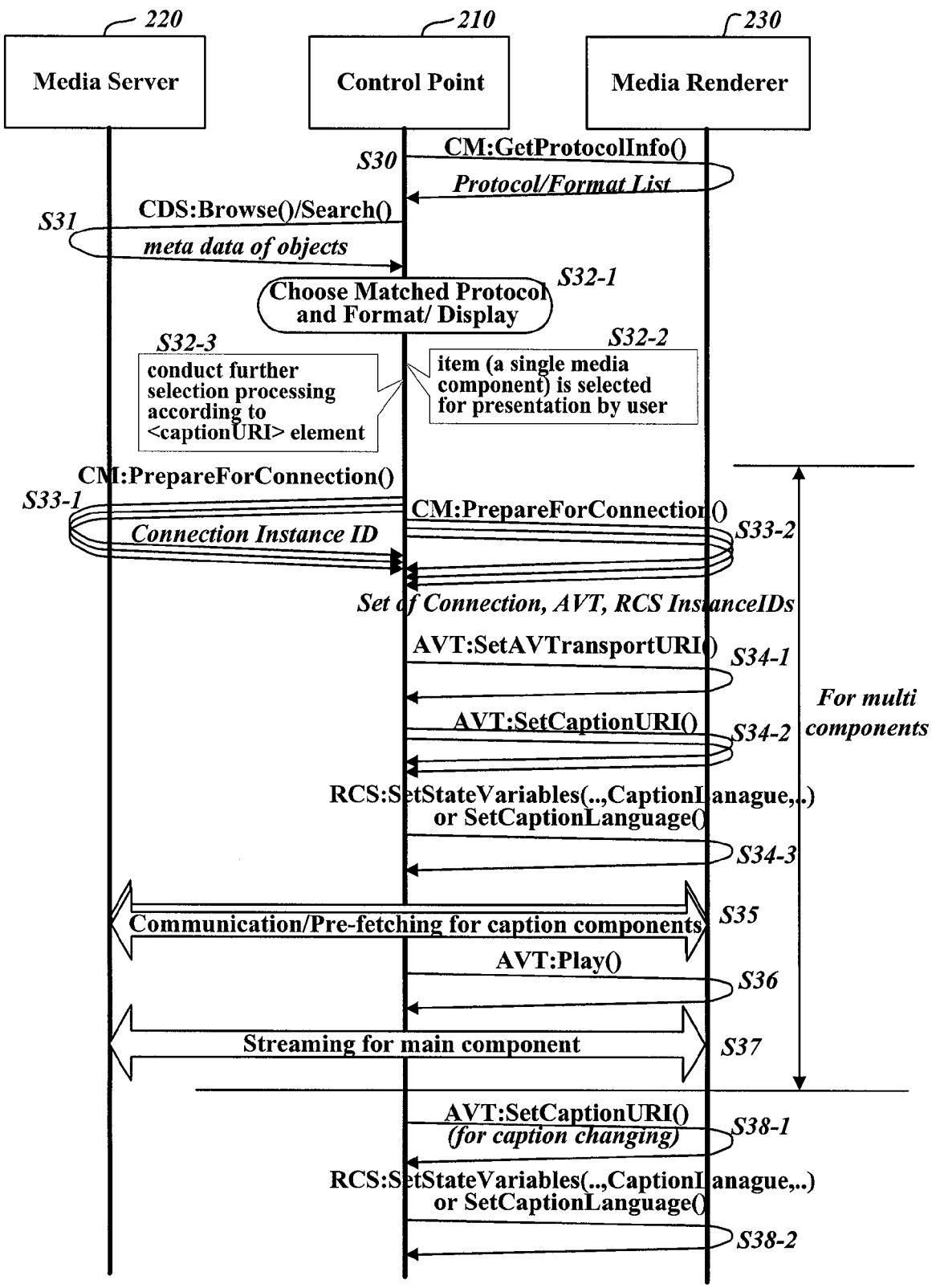

FIG. 4A

```
<DIDL-Lite ..................... >
    <item ..................................................... >
        Legacy item property including <res> element          — 401

Expression part of caption components                 — 402
              (<captionURI > elements)
    </item>
</DIDL-Lite>
```

FIG. 4B

| Property | Data Type | Description |
|---|---|---|
| upnp:captionURI | xsd:anyURI | Contain a reference to a file for the captioning. It depends on captionURI@Profile |
| upnp:captionURI@Profile | xsd:string | Indicate the format of the captioning. e.g., SAMI, SMIL, etc. |
| upnp:captionURI@Filename | xsd:string | Indicate the name of file referred by captionURI. |
| upnp:captionURI@Language | xsd:string | Indicate languages supported by the caption (CSV) |

FIG. 4C

| Property | Data Type | Example |
|---|---|---|
| upnp:captionURI | xsd:anyURI | http://192.168.1.208:54919/MediaServerContent_0/2/00000000000000007/%20-%20SAMI_Ko_En.smi |
| upnp:captionURI@Profile | xsd:string | SAMI |
| upnp:captionURI@Filename | xsd:string | SAMI_Ko_En.smi  ← 402b |
| upnp:captionURI@Language | xsd:string | en-US, ko-KR  ← 402a |

FIG. 4D

| Property | Data Type | Example | |
|---|---|---|---|
| upnp:captionURI | xsd:anyURI | http://192.168.1.208:54919/MediaServerContent_0/2/00000000000000007/%20-%20SMIL_sample.smi | 402e1 |
| upnp:captionURI@Profile | xsd:string | SMIL | 402d1 |
| upnp:captionURI@Filename | xsd:string | SMIL_sample.smi (or SMIL_sample.SMIL) | |
| upnp:captionURI@Language | xsd:string | en-US, ko-KR ← 402c | |
| upnp:captionURI | xsd:anyURI | http://192.168.1.208:54919/MediaServerContent_0/2/00000000000000007/%20-%20SMIL_sample_en.rt | 402d2 / 402e2 |
| upnp:captionURI@Profile | xsd:string | SMIL | |
| upnp:captionURI@Filename | xsd:string | SMIL_sample_en.rt | |
| upnp:captionURI@Language | xsd:string | en-US | |
| upnp:captionURI | xsd:anyURI | http://192.168.1.208:54919/MediaServerContent_0/2/00000000000000007/%20-%20SMIL_sample_ko.rt | 402d3 / 402e3 |
| upnp:captionURI@Profile | xsd:string | SMIL | |
| upnp:captionURI@Filename | xsd:string | SMIL_sample_ko.rt | |
| upnp:captionURI@Language | xsd:string | ko-KR | |

FIG. 5

*SetCaptionURI()*

| Argument | Direction | relatedStateVariable |
|---|---|---|
| InstanceID | IN | A_ARG_TYPE_InstanceID |
| CaptionURI | IN | AVTCaptionURI |

FIG. 7

*SetAVTransportURI()*

| Argument | Direction | relatedStateVariable |
|---|---|---|
| InstanceID | IN | A_ARG_TYPE_InstanceID |
| CurrentURI | IN | AVTransportURI |
| CaptionURI | IN | AVTCaptionURI |
| CurrentURIMetaData | IN | AVTransportURIMetaData |

METHOD FOR PROCESSING INFORMATION OF AN OBJECT FOR PRESENTATION OF MULTIPLE SOURCES

CROSS-REFERENCE TO RELATED APPLICATIONS

This application is the National Stage filing under 35 U.S.C. 371 of International Application No. PCT/KR2006/005124, filed on Nov. 30, 2006, which claims the benefit of U.S. Provisional Application No. 60/763,032, filed on Jan. 27, 2006.

TECHNICAL FIELD

The present invention relates to a method for processing information among devices on a network, e.g., a UPnP-based network in order to conduct synchronized presentation of mutually associated content sources stored in an arbitrary device on the network.

BACKGROUND ART

People can make good use of various home appliances such as refrigerators, TVs, washing machines, PCs, and audio equipments once such appliances are connected to a home network. For the purpose of such home networking, UPnP™ (hereinafter, it is referred to as UPnP for short) specifications have been proposed.

A network based on UPnP consists of a plurality of UPnP devices, services, and control points. A service on a UPnP network represents a smallest control unit on the network, which is modeled by state variables.

A CP (Control Point) on a UPnP network represents a control application equipped with functions for detecting and controlling other devices and/or services. A CP can be operated on an arbitrary device which is a physical device such as a PDA providing a user with a convenient interface.

As shown in FIG. 1A, an AV home network based on UPnP comprises a media server (MS) 120 providing a home network with media data, a media renderer (MR) 130 reproducing media data through the home network and an AV control point (CP) 110 controlling the media server 120 and media renderer 130. The media server 120 and media renderer 130 are devices controlled by the control point 110.

The media server 120 (to be precise, CDS 121 (Content Directory Service) inside the server 120) builds beforehand information about media files and containers (corresponding to directories) stored therein as respective object information. 'Object' is a terminology encompassing items carrying information about more than one media file and containers carrying information about directories; an object can be an item or container depending on a situation. And a single item may correspond to multiple media files. For example, multiple media files of the same content but with a different bit rate from each other are managed as a single item.

FIG. 1B illustrates a simplified signal flow among devices describing media playback process carried out on a network of FIG. 1A, which is described in the following. First, the control point (CP) 110 obtains information about a protocol which the media renderer (MR) 130 can accommodate (S01). The media server (MS) 120, in order to notify the control point 110 of information about a directory and media files under the directory, notifies of information about a current directory and item information about media files under the directory each time a UPnP action 141, e.g., a browsing action, occurs in response to the user's request (S10).

The CP 110 excludes information about an item not conforming to an acceptable protocol provided by the media renderer 130 from the received information about each object, thus displaying the information to the user through a relevant UI (S11-1). If the user selects an item (or a media file of a particular feature belonging to the item) through the UI (S11-2), the CP 110 invokes a connection preparation action (PrepareForConnection( )) on each of the media server 120 and media renderer 130 for presentation of the selected media file (from now on, it is referred to as 'component' or 'media component') and receives instance IDs about joined service elements (CM, AVT, RCS) required for presentation based on streaming between the two devices 120, 130 (S12-1, S12-2). The instance ID is used to specify and subsequently control, for each service element, a streaming service to be carried out now. The CP 110 delivers access location information (e.g., URL (Universal Resource Locator) information) about a previously selected component to AVTransport service 133 (in the example of FIG. 1A, AVTransport service is installed in a media renderer 130 but it can also be installed in a media server 120) along with previously-received instance ID of AVT through an action to set thereon (S13) and by invoking (S14) a playback action carrying the previously-received instance ID of AVT to AVTransport service 133, the CP 110 makes data of the component selected through a relevant information exchange process between the media renderer 130 and media server 120 streamed and displayed by RCS 131 (S15).

If it is the case that an additional media file is to be presented during the presentation (S15), the procedure described above (S11-2, S12-1, S12-2, S13, S14) should be repeated after the start of the presentation. According to circumstances, S10 and S11-1 can also be carried out.

The method of carrying out the above procedure sequentially against two or more media components, however, cannot be easily applied to the case where two or more media components should be reproduced in synchronization with each other (hereinafter, two or more media components associated with each other are called as 'multiple components'), e.g., the case where one media component is a movie and the other one is subtitle data of the movie. It is because, if sequential reproduction were to be carried out, synchronized presentation at a media renderer could be hard to achieve or impossible due to time delay.

DISCLOSURE OF THE INVENTION

The present invention is directed to structure information about items in order for media components to be presented in association with each other to be presented exactly and provide a signal processing method among devices according to the structured information.

A method for presenting a content through data transmission between both devices in accordance with the present invention, comprises issuing a connection preparation action to the both devices respectively for each of components, if a main component or one main component selected from a plurality of main components pertaining to the content is associated with at least one auxiliary component; issuing a first action for setting access location information of the selected main component and a second action for setting access location information of the at least one auxiliary component respectively to at least one of the both devices, the second action being different from the first action; and issuing an action for requesting playback of the selected main component to at least one of the both devices so that the selected main component and the at least one auxiliary component associated therewith are presented synchronously.

In one embodiment according to the present invention, before the playback requesting action is invoked a device or a service to which the second action is invoked starts to receive the at least one auxiliary component corresponding to access location information specified by the second action.

In one embodiment according to the present invention, the second action is also used to change an auxiliary component being presented in synchronization with the main component to other auxiliary component.

In one embodiment according to the present invention, the second action has input arguments carrying information about an instance ID, and access location of an auxiliary component.

In one embodiment according to the present invention, a connection preparation action for an auxiliary component (and an additional component, if any, containing sync information for synchronized presentation of the auxiliary component) of language chosen by a user among all of auxiliary components associated with the main component is also invoked when other connection preparation action for at least one auxiliary component associated with the main component is invoked.

Another method for presenting a content through data transmission between both devices in accordance with the present invention, comprises issuing a connection preparation action to the both devices for a main component or one main component selected from a plurality of main components pertaining to the content; issuing an action for setting both access location information of the selected main component and access location information of at least one auxiliary component associated with the selected main component to at least one of the both devices; and issuing an action for requesting playback of the selected main component to at least one of the both devices so that the selected main component and the at least one auxiliary component associated therewith are presented synchronously.

In one embodiment according to the present invention, before streaming of the selected main component is started a device or a service to which the second action is invoked completes download of at least one auxiliary component corresponding to access location information, specified by the access location information setting action, of at least one auxiliary component.

In another embodiment according to the present invention, a device or a service to which the playback requesting action is issued conducts synchronized presentation of the selected main component and the at least one auxiliary component corresponding to access location information of at least one auxiliary component specified by the access location information setting action while receiving the at least one auxiliary component and the selected main component together in streaming manner.

In one embodiment according to the present invention, the access location information setting action is also used to change an auxiliary component, which is being presented in synchronization with the main component according to invoking of the playback requesting action, to other auxiliary component.

In one embodiment according to the present invention, an input argument of the access location information setting action includes access location information of a main component, access location information of an auxiliary component, meta data of the content and an ID.

In one embodiment according to the present invention, when setting access location information of at least one auxiliary component associated with the main component along with access location information of the main component, access location information is set for an auxiliary component (and an additional component, if any, containing synchronization information for synchronized presentation of the auxiliary component) of language chosen by a user among all of auxiliary components associated with the main component.

In one embodiment according to the present invention, information on what language an auxiliary component is related to is delivered to a service for controlling data rendering through invoking of an action when synchronized presentation of the main component and associated auxiliary component is started or change of an auxiliary component is requested.

In one embodiment according to the present invention, the access location information is URL (Universal Resource Locator).

BRIEF DESCRIPTION OF THE DRAWINGS

FIG. 1B illustrates a signal flow among devices for a media playback procedure carried out on the network of FIG. 1A;

FIG. 3 illustrates signal flows among devices for a media playback of multiple components carried out on the network of FIG. 2 according to an embodiment of the present invention;

FIG. 4A illustrates a simplified structure of item information according to one embodiment of the present invention, the structure being constructed including information about auxiliary content presented in association with the corresponding content;

FIG. 4B illustrates a structure of caption expression information 402 of FIG. 4A according to one embodiment of the present invention;

FIGS. 4C and 4D respectively illustrate examples of caption expression information prepared according to the structure of FIG. 4B;

FIG. 5 illustrates the structure of an action for delivering access location information of an auxiliary content according to an embodiment of the present invention;

FIG. 7 illustrates the structure of an action for delivering access location information of a content and an auxiliary content associated with the content in accordance with the embodiment illustrated in FIG. 6.

BEST MODE FOR CARRYING OUT THE INVENTION

Hereinafter, according to the present invention, embodiments of the present invention will be described in detail with reference to appended drawings.

Figure 1A:
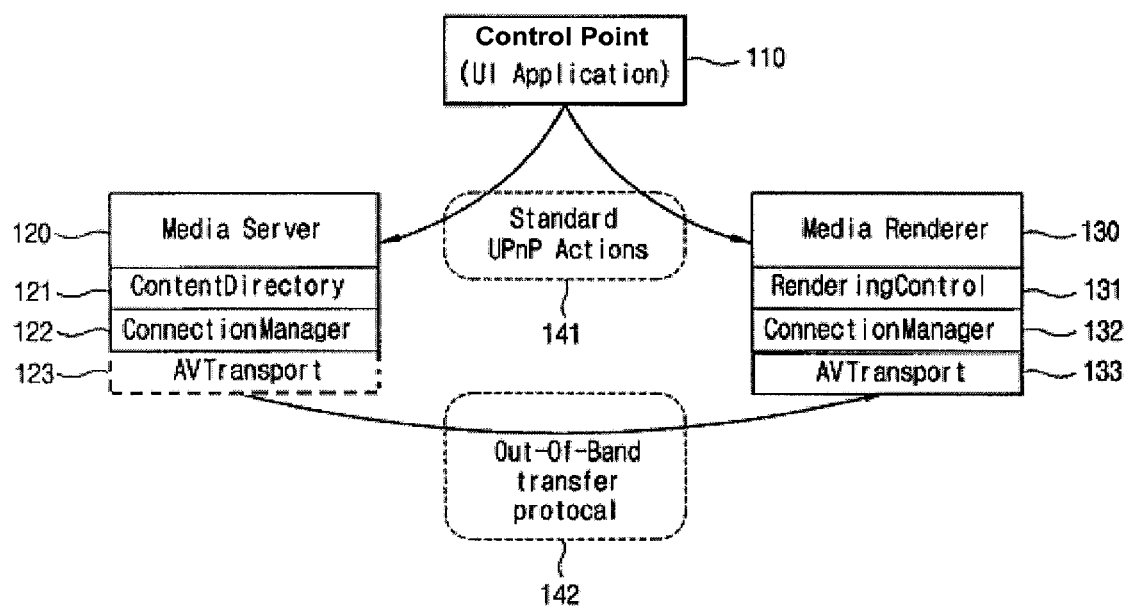
FIG. 1A illustrates a general structure of a UPnP AV network.
Figure 2:
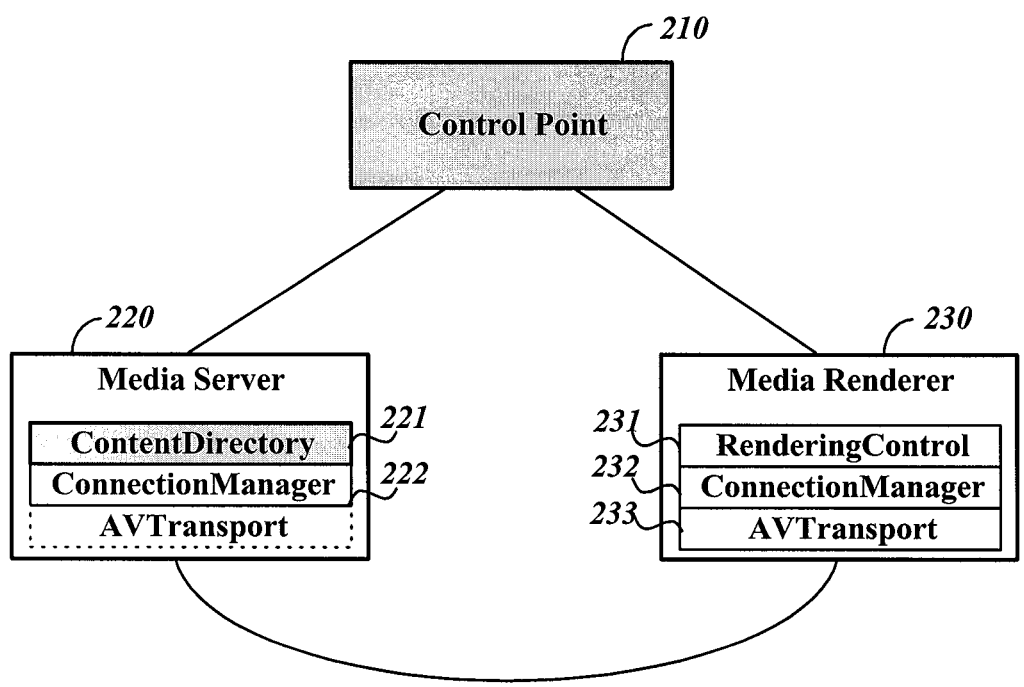
FIG. 2 illustrates structuring item information for content having associated auxiliary content and networked devices carrying out signal processing among devices.

FIG. 2 illustrates a simplified example of structuring item information for a component having an associated component and networked devices carrying out signal processing between devices. The network shown in FIG. 2 is an AV network based on UPnP, including a control point 210, a media server 220, and a media renderer 230. Although description on the present invention is given to networked devices based on UPnP standard, what are described in the following can be directly applied to other network standards by adaptively substituting necessary elements with regard to differences of the standards where the present invention may apply. In this regard, therefore, the present invention is not limited to a network based on UPnP.

Structuring item information for multiple components according to the present invention is conducted by CDS 221 within the media server 220. Signal processing for multiple components according to an embodiment of the present invention is carried out according to the illustrated procedure of FIG. 3 centering on the control point 210.

Meanwhile, composition of devices and procedure of signal processing illustrated in FIGS. 2 and 3 are related to one of two different methods for streaming a media component, namely, pull method between push and pull method. However, difference between push and pull method lies only in the fact that a device equipped with AVTransport service for playback management of streaming or an employed device can be varied and subsequently the direction of an action can be varied according to whether the object of the action is a media server or media renderer. Therefore, methods for conducting actions described in the following can be equally applied to both of push and pull method and interpretation of the claimed scope of the present invention is not limited to those methods illustrated in the figures and description.

CDS 221 within the media server 220 (which may be a processor executing software) prepares item information about media components, namely meta data about each component or a group of components in the form of a particular language through search for media files stored in a mass storage such as a hard disk. At this time, media files associated for synchronized presentation, e.g., caption (subtitle) files storing information for displaying subtitles are considered as individual content and single item information is created. FIG. 4A shows the structure of item information according to one embodiment of the present invention created by the above method. That is to say, among individual components considered to belong to a single item, in addition to item property information 401 including legacy resource elements (resource element: <res>) containing information about a main component (e.g., AV stream) or main components whose bit rates are different each other, caption expression information 402 specifying an auxiliary component (e.g., subtitles, voice, etc.) or auxiliary components are additionally prepared.

The CDS 221 determines inter-relation among respective media files and which is a main component or auxiliary component from, e.g., the name and/or extension of each file. If necessary, information about properties of each file, whether the file is a text or image and/or coding format can also be determined from the extension of the corresponding file. Also, if needed, the above information can be identified from header information within each file by opening the corresponding file; further, the above information can be easily obtained from a DB about pre-created files (by some other application programs) for stored media files, which is stored in the same medium.

FIG. 4B illustrates types of property information recorded in the caption expression information 402 according to one embodiment of the present invention. As illustrated, the caption expression information 402 records information about URI (Universal Resource Locator) of a caption file, information about the format of the caption file (the notation of captionURI@Profile in the figure represents information as specified by a profile attribute describing the element of <captionURI>, that is, information specified by an expression form of <captionURI Profile=>), name of the caption file (captionURI@Filename), and language supported by the caption file (captionURI@Language). The format of the caption file represents a recording method by which information about a caption is stored in a file, which for example, can be SAMI or SMIL. Although properties of caption expression information illustrated in FIG. 4B are related to a subtitle which displays spoken words in a video with characters, as mentioned earlier, the properties can also be applied to a file about voice associated with a video, or a file of some other type, e.g., a data file such as a slideshow. It is certain that change, modification, or addition of relevant property information is necessary; however, simple change or addition accompanying the change of properties of data (caption, voice, etc.) can be understood to still belong to the scope of the present invention. If properties of data are different, specification thereof can be done by using a profile about the format (captionURI@Profile).

FIG. 4C illustrates an example of caption expression information 402 being prepared as information for a caption has been prepared in the format of SAMI according to an exemplified structure of the caption expression information of FIG. 4B. Since a file in SAMI format can accommodate file synchronization information to synchronize with image data and caption data supporting multiple languages all within a single file, as shown in FIG. 4C, recorded are a filename 402a specifying a corresponding file and supported languages of caption data stored in the file, namely, information specifying English and Korean 402b.

FIG. 4D illustrates an example of caption expression information 402 being prepared as information for a caption has been prepared in the format of SMIL according to an exemplified structure of the caption expression information of FIG. 4B. For the case of SMIL format, synchronization information for synchronizing with image data (since the synchronization information is equally applied to data files of various languages, all of language information of provided caption data files (SMIL_sample_en.rt, SMIL_sample_ko.rt) are recorded in the supported language property (captionURI@Language) of the synchronization information 402c) and caption data are stored in a separate file; and caption data are also stored in separate files according to respective languages. Therefore, for the case of SMIL format, as shown in the preparation example of FIG. 4D, synchronization information file (SMIL_sample_smi) and two files (SMIL_sample_en.rt, SMIL_sample_ko.rt) supporting two languages (English and Korean) are represented by respective <captionURI> elements. Namely, multiple <captionURI> elements $402d_1$, $402d_2$, $402d_3$ are included in the caption expression information 402. In another embodiment according to the present invention, by specifying the extension of a synchronization information file prepared according to SMIL format as SMIL (*.SMIL), caption files (*.smi) prepared according to SAMI format can be distinguished in terms of the type of extension.

The item information prepared as illustrated in FIG. 4A is delivered to the CP 210 from the CDS 221 through a browsing or a search action of the CP 210 as shown in FIG. 3 (S31). A request for acceptable protocol information is made to a media renderer 230 by the CP 210 to obtain the acceptable protocol information of the media renderer 230 (S30) before the above mentioned actions.

The CP 210 provides a user through proper UI (User Interface) with only objects (items) containing protocol information acceptable to the media renderer 230 among objects whose information is received at the step S31 (S32-1). On a provided list of the objects, a user selects an item (or one component from multiple components, whose bit rates are different each other, pertaining to the item) to be presented by the media renderer 230 (S32-2). However, if meta data of the selected item contains caption expression information (the element <captionURI> structured according to FIG. 4B), the CP 210 does not conduct actions for presentation of component of the selected item immediately. Instead, the CP 210 interprets the caption expression information and conducts additional selection operations according to the interpretation (S32-3).

If there is no caption expression information in meta data of the selected item, actions (PrepareForConnection( ), SetAVTransportURI( ), Play( ) etc.) needed for starting presentation of the selected component are immediately invoked in proper order. Otherwise, the CP 210 examines the property information caption@Language of each element <captionURI> and provides a user with list of information on supportable languages on a screen through proper UI. Through the UI, the user selects one language from the provided list. For a file (single file in case of the example of FIG. 4C because the single file contains both sync information and caption data for all of supportable languages) or files (two files, i.e., a sync information file and a file containing caption data for the selected language in case of the example of FIG. 4D) besides a content corresponding to the selected item, the CP 210 further invokes a connection preparation action to the media server 220 and the media renderer 230 respectively to obtain instance ID for each component from the ConnectionManager services 222 and 232 on both of the devices (S33-1, S33-2). In one embodiment according to the present invention, the ConnectionManager services 222 and 232 assign instance ID for each service (CM, AVT, RCS) in response to one-time invocation of the connection preparation action and also allocate resources (for example, memory space, port number etc.) of the media renderer 230 to be used for the instance ID group (which means instance IDs assigned respectively for CM, AVT and RCS. Hereinafter, the term of instance ID is also used to mean instance ID group, and if the term of instance ID has a preceding particular service name it designates an individual instance ID related to the particular service.). Information on the allocated resources is notified to other services (AVT, RCS) so that the assigned instance ID and the allocated resources to be used are linked each other. In the meantime, the signal processing flow shown in FIG. 3 illustrates an example in which two files (a sync information file and a caption data file for chosen language) are pre-fetched to the media renderer 230 in case of the information structure (e.g., three files for captioning) of FIG. 4D.

The CP 210 invokes an action SetAVTransportURI( ) using AVT instance ID assigned to corresponding component to set access location information, e.g., URL (Universal Resource Locator) for the selected main content onto AVTransport service 233 (S34-1). Also for URLs of caption files, the CP 210 invokes an action SetCaptionURI( ), distinguished from the action SetAVTransportURI( ), using each AVT instance ID assigned to corresponding components to set onto the AVTransport service 233 (S34-2). Invoking order of the actions SetAVTransportURI( ) and SetCaptionURI( ) may be changed. The action SetCaptionURI( ) includes input arguments as illustrated in FIG. 5. In the embodiment of FIG. 3, the action SetCaptionURI( ) is invoked for each of files for captioning. In another embodiment according to the present invention, the action SetCaptionURI( ) is invoked just once for files for captioning. In this embodiment, input arguments included in the action SetCaptionURI( ) carry multiple URLs for multiple files for captioning.

The CP 210 invokes an action SetStateVariables( ) including input argument StateVariableValuePairs carrying information (CaptionLanguage) on caption language chosen from a user to deliver the information on the chosen caption language chosen to RenderingControl service 231 (S34-3). At this time, the action SetStateVariables( ) uses RCS instance ID assigned to the corresponding caption component. Instead of the general action SetStateVariables( ) used for setting state variables to an arbitrary service, an action having a particular name, e.g., SetCaptionLanguage( ) may be used to set information on caption language chosen by a user to the RenderingControl service 231 (S34-3). The action for setting information on caption language chosen by a user to the RenderingControl service 231 is invoked before another action for requesting playback is invoked (S36). The RenderingControl service 231, which the action for setting information on caption language is invoked to, copies the information on caption language received through the corresponding action to its own state variable 'CurrentCaptionLanguage'.

In the meantime, when each action SetCaptionURI( ) is received the AVTransport service 233 copies information, carried by the input argument 'CaptionURI' of the action SetCaptionURI( ), to its own state variable 'AVTCaptionURI' and then starts to download a file (sync information file or caption data file of chosen language) for captioning associated with URL indicated by the state variable through proper information communication with the media server 220 (S35). That is, a file or files for captioning associated with URL notified by the action SetCaptionURI( ) are pre-fetched into the media renderer 230 before streaming of the selected main content.

However, after copying URL associated with a source (main content file) carried by the action SetAVTransport URI( ) to a local state variable, the AVTransport service waits for invocation of the next action.

Now, the CP 210 invokes a play action using AVT instance ID obtained previously for the main content to the AVTransport service 233 (S36). Accordingly, data of the selected main content starts to be streamed after appropriate information communication between the media renderer 230 and the media server 220, and the streamed data occupies the resources allocated for corresponding instance ID. Under control of the RenderingControl service 231, the streamed data is decoded together with and in synchronization with data of the pre-fetched files for captioning by each corresponding decoder (or a single combined decoder) (S37). In the meantime, even though the play action is received, the AVTransport service 233 may suspend to request data streaming until corresponding files associated with URLs indicated by the previously-received actions SetCaptionURI( ) are all downloaded completely.

While content of the selected item is being presented along with caption data after the above processes, a user may command to change caption to other language through appropriate UI provided by the CP 210. In that case, the CP 210 examines current presentation state first to know what caption languages are supportable, and displays supportable caption languages. After user's selection of a certain caption language, the CP 210 checks whether the user's selection requires change of current caption language. Determined to require change, the CP 210 provides the AVTransport service 233 with URL of a file containing caption data of newly-selected language through the action SetCaptionURI( ) (S38-1). For examining current presentation state, the CP 210 makes request for query of instance IDs assigned and being used at present to ConnectionManager service 233 of the media renderer 230, and then inquires meta data (data stored in state variable 'CurrentURIMetaData') of the content being streamed at present using AVT instance ID obtained according to the request for query. Examining caption expression information 402 structured in FIG. 4B included in the meta data obtained according to the inquiry, the CP 210 knows what caption languages are supportable, provides a list of supportable caption languages for a user and receives user's selection of a single caption language. In addition, the CP 210 also receives, through an action GetStateVariables( ) or a particular action GetCaptionLanguage( ), information on caption language (information stored in a state variable 'CurrentCaptionLanguage') being rendered at present by the RenderingControl service 231, compares information on caption language chosen previously by a user with the received information to determine whether the chosen caption language is different from the language being currently presented, and provides through the action SetCaptionURI( ) URL of a file containing caption data of a newly-selected language for the AVTransport service 233 as explained above (S38-1) if determined to be different.

At this time, the CP 210 uses the AVT instance ID, which has been assigned through the action PrepareForConnection( ) for the previously-selected caption data file pre-fetched in the media renderer 230, in the action SetCaptionURI( ) as it is.

In addition, the CP 210 invokes the action SetStateVariables( ) or SetCaptionLanguage( ) to the RenderingControl service 231 (S38-2) to notify of information on changed caption language and the RenderingControl service 231 updates the state variable 'CurrentCaptionLanguage' with the received information on new caption language. After updating the state variable 'CurrentCaptionLanguage', the RenderingControl service 231 checks whether the caption data occupying the allocated resources being used at present includes data matched with the changed caption language or not. If matched data is included the RenderingControl service 231 controls a decoder to render the matched data, otherwise it waits until data of the changed caption language occupies the allocated resources.

In the meantime, the AVTransport service 233, which the action SetCaptionURI( ) is invoked to, examines instance ID and URL of a source received through the action to know whether URL stored in a state variable 'AVTCaptionURI' associated with the received instance ID is identical to the received URL. If identical the action SetCaptionURI( ) is ignored, otherwise the state variable 'AVTCaptionURI' is updated to the received URL and the source pointed by the received URL is downloaded from the media server 220. The downloaded data of the source (file) is overwritten to the resources that have been occupied by previously-received caption data of caption language chosen at the beginning by a user. As a result, caption data of change-requested language starts to be rendered. Namely, caption data of a language designated newly from a user is displayed in synchronization with presentation timing of the main content.

Figure 6:
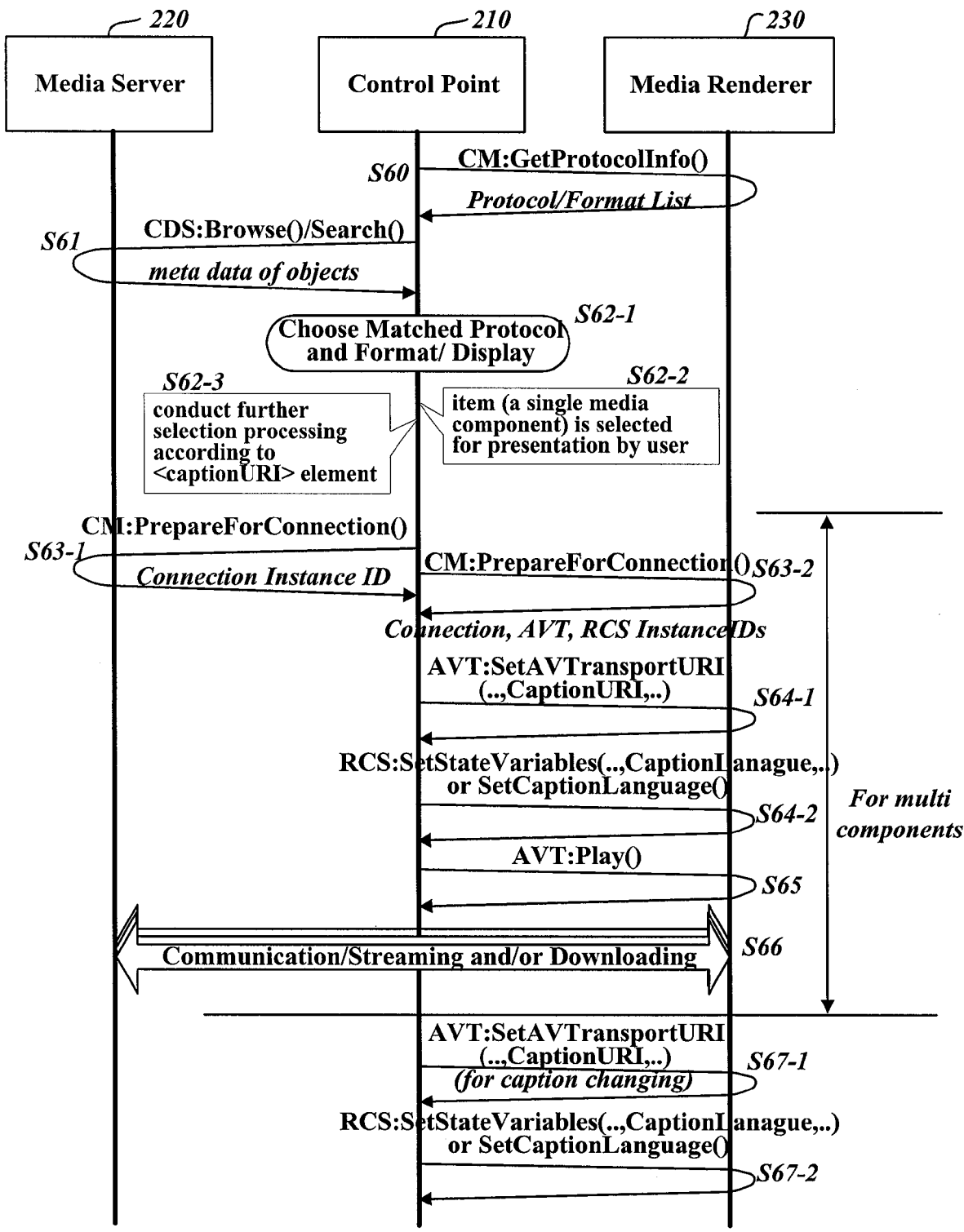
FIG. 6 illustrates signal flows among devices, conducted on the network of FIG. 2, for presentation of multiple components according to another embodiment of the present invention.

FIG. 6 illustrates signal flows, conducted on the network of FIG. 2, for multi components according to another embodiment of the present invention. Different from the embodiment of FIG. 3 in which instance IDs are assigned to and used for files for captioning, the present embodiment does not assigns an instance ID to any file for captioning and uses an instance ID assigned to main content for the files for captioning instead. The present embodiment will be described in detail hereinafter.

As shown in FIG. 6, information on each item is delivered from the CDS 221 to the CP 210 in response to a browsing or a search action issued by the CP 210 (S61). A request for acceptable protocol information is made to a media renderer 230 by the CP 210 to obtain the acceptable protocol information of the media renderer 230 (S60) before issuing of the above mentioned action.

The CP 210 provides a user through proper UI with only objects (items) containing protocol information acceptable to the media renderer 230 among objects whose information is received at the step S31 (S62-1). On a provided list of the objects, a user selects an item (or one component from multiple components, whose bit rates are different each other, pertaining to the item) to be presented by the media renderer 230 (S62-2). If there is no caption expression information in meta data of the selected item, actions (PrepareForConnection( ), SetAVTransportURI( ), Play( ) etc.) needed for starting presentation of the selected component are immediately invoked in proper order. Otherwise, the CP 210 examines the property information caption@Language of each element <captionURI> and provides a user with list of information on supportable languages on a screen through proper UI. Through the UI, the user selects one language from the provided list (S62-3). In the meantime, the CP 210 invokes a connection preparation action for main content of a selected item to obtain instance ID of the main content (S63-1, S63-2).

For a file (single file in case of the example of FIG. 4C because the single file contains both sync information and caption data for all of supportable languages) or files (two files, i.e., a sync information file and a file containing caption data for the selected language in case of the example of FIG. 4D) needed for presentation of the selected language, the CP 210 does not invokes a connection preparation action. Instead, the CP 210 invokes an action SetAVTransportURI( ) using AVT instance ID obtained for the selected main content to set access location information, e.g., URL of the file or files together with URL of the selected main content onto the AVTransport service 233 (S64-1). Furthermore, the CP 210 invokes an action SetStateVariables( ) including input argument StateVariableValuePairs carrying information (CaptionLanguage) on caption language chosen from a user or a particular action SetCaptionLanguage( ) including input argument carrying information on the selected caption language to deliver the information on the selected caption language to the RenderingControl service 231 (S64-2). At this time, the action SetStateVariables( ) or SetCaptionLanguage( ) uses RCS instance ID assigned to the main content.

The action SetAVTransportURI( ) used for delivering URL of a component includes input arguments illustrated in FIG. 7. As illustrated, the action SetAVTransportURI( ) includes input arguments for access location information (CaptionURI) of a file or files for captioning as well as access location information (CurrentURI) and meta data (CurrentURIMetaData) of a selected main content.

The AVTransport service 233 having received the action SetAVTransportURI( ) copies information carried by each input argument to each corresponding state variable and then waits for invocation of the next action.

If the CP 210 invokes a play action using AVT instance ID obtained previously for the main content to the AVTransport service 233 (S65), the AVTransport service 233 requests streaming or downloading of source data associated with each URL stored in its own state variables, which are corresponding to the arguments CurrentURI and CaptionURI respectively, after appropriate information communication with the media server 220. Afterwards, the data being streamed or downloaded occupies the resources allocated for corresponding instance ID and is then decoded in synchronization with each other by each corresponding decoder (or a single combined decoder) under control of the RenderingControl service 231 (S66).

If multi-streaming is supported, data of a file for captioning can be presented through streaming in the same manner that data of a main content is presented. Otherwise, it is downloaded into the media renderer 230 before streaming of the main content. Afterwards, when streaming of the main content starts, the downloaded caption data is presented according to sync information along with presentation of the main content.

While content of the selected item is being presented along with caption data after the above processes, a user may command to change caption to other language through appropriate UI provided by the CP 210. If change is commanded, the CP 210 examines current presentation state first in the same manner explained for the aforementioned embodiment, and displays supportable caption languages. If it is determined that user's selection from the displayed information requires change in caption language, the CP 210 provides the RenderingControl service 231 with information on selected caption language to change to by invoking the action SetStateVariables( ) or SetCaptionLanguage( ), and further provides the AVTransport service 233 with URL of a file containing caption data of the newly-selected caption language through the action SetAVTransportURI( ) (S67-1, S67-2). For example, the input argument CurrentURI of the action SetAVTransportURI( ) carries URL (identical to URL delivered by the action SetAVTransportURI( ) at the aforementioned step S64-1) of a main content (item, or main component selected before) being streamed at present and the other input argument CaptionURI carries URL of a file containing caption data of said other language.

Those processes are explained in more detail with reference to the example of FIG. 4D. Supposing that the first selected caption language is 'English' and the next selected caption language to change to is 'Korean', the argument captionURI of the first action SetAVTransportURI( ) carries URLs 402e$_1$ and 402e$_2$ and the argument captionURI of the second action SetAVTransportURI( ) carries URLs 402e$_1$ and 402e$_3$ to notify the AVTransport service 233 of URLs of files containing caption data for newly-selected language. At this time, the CP 210 uses the AVT instance ID, which has been assigned for the main content being presented at present, in the action SetAVTransportURI( ) as it is. The action SetAVTransportURI( ) can be also used for a single content having no associated auxiliary content. When used for such a single content, the argument CaptionURI of the action SetAVTransportURI( ) is filled with the string 'NULL'.

The AVTransport service 233, which the action SetAVTransportURI( ) whose input arguments are constructed as above is invoked to, examines information carried by all the input arguments and checks whether there is any difference between the received information and the stored information in the corresponding state variables 'AVTransportURI' and 'AVTCaptionURI' associated with instance ID carried by the action. If there is no difference the received action is ignored, otherwise the state variables related to the different information are updated with the received corresponding information and the source pointed by URL pertaining to the different information is streamed or downloaded from the media server 220. The downloaded or streamed data of the source is overwritten to the resources that have been occupied by previously-received caption data of caption language chosen at the beginning by a user. As a result, caption data of change-requested language starts to be rendered. Namely, caption data of a language designated newly from a user is displayed in synchronization with presentation timing of the main content.

In another embodiment according to the present invention, if there is difference between information stored in state variables and information carried by corresponding input arguments included in the received action SetAVTransportURI( ), a source pointed by URL pertaining to the different information is not immediately streamed or downloaded. Instead, the streaming or downloading is started the moment a play action is received.

In another embodiment according to the present invention, when URL of other caption file is provided to change current caption language, the argument CurrentURI may carry 'NULL'. If 'NULL' is carried, the AVTransport service 233 treats information stored in the corresponding state variable 'AVTransportURI' as unchanged.

In the embodiments explained above, the CP 210 can control display of caption data being presented in response to user's request. The RenderingControl service 231 defines and uses a state variable 'Caption' for control of caption display. The state variable 'Caption' can become active or inactive according to a value included in the input argument StateVariableValuePairs carried by the action SetStateVariables( ) and be inquired together with other state variables by the action GetStateVariables( ). In other embodiment according to the present invention, a particular action for managing ON/OFF of caption displaying, e.g., SetCaption( ) or GetCaption( ) may be defined such that the action SetCaption( ) is invoked to make the state variable 'Caption' active or inactive and the action GetCaption( ) is invoked to inquire value of the state variable 'Caption'.

In the event that the state variable 'Caption' is in active state (TRUE), the RenderingControl service 231, as explained above, presents caption data in synchronization with main content being streamed. In the event that the state variable 'Caption' is inactive (FALSE) the RenderingControl service 231 does not present caption data.

For controlling display of caption, a variety of state variables for e.g., font, vertical and horizontal position of caption, etc. can be defined and used besides the state variable 'Caption'. Such various state variables can be controlled or inquired as described above, namely by the action SetStateVariables( ) and GetStateVariables( ) or by new particular actions defined for corresponding state variables only.

The present invention described through a limited number of the above exemplary embodiments, while data is transferred and presented between interconnected devices through a network, enables a main component to be played back at the same time together with an auxiliary component such as caption data associated therewith and further enables change of an auxiliary component, thereby improving convenience of manipulation as well as user's feeling of satisfaction about watching or listening to a main content.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for presenting a component through data transmission between devices, the method comprising:
   issuing a browse action to one of the devices for obtaining an auxiliary component associated with a main component,
   wherein the auxiliary component includes audio data and caption data, wherein the caption data comprises location information of the caption data, type information of the caption data, identification information of the caption data and language information of the caption data;

receiving a browse response in response to the browse action, wherein the browse response includes the auxiliary component associated with the main component, and wherein the browse response further includes second access location information for accessing the audio data when the main component is configured to be played synchronously with the audio data;

issuing a connection preparation action to at least one device for the main component;

receiving a transmission identifier (ID) for identifying an instance of a transporting service of the main component;

generating a first action including the received transmission ID, first access location information for accessing the main component, and the second access location information for accessing the audio data;

issuing the first action for setting both the first access location information for accessing the main component and the second access location information for accessing the audio data with the transmission ID to the at least one device;

issuing, after the first action is issued, a single second action including the transmission ID, for requesting playback of the main component to the at least one device, wherein the main component accessed by the first access location information and the audio data accessed by the second access location information are played synchronously; and issuing a third action to the at least one device to change the audio data, which is being played in synchronization with the main component according to the second action, to another audio data, wherein the audio data and the other audio data are related to the same main component.

2. The method of claim 1, wherein the third action used for changing an the audio data being played uses the same transmission ID included in the second action.

3. The method of claim 1, wherein an action name of the second action is identical to that of an action used to set access location information for presentation of content associated with no auxiliary content to present synchronously.

4. The method of claim 1, wherein the main component consists of AV data.

5. The method of claim 1, wherein the second action is for setting together both the first access location information for accessing the main component and the second access location information for accessing the audio data.

6. The method of claim 5, wherein the second action is for further setting access location information of a component, which contains synchronization data needed for synchronized presentation of the audio data, along with access location information of the main component.

7. An apparatus for presenting a component through data transmission between devices, the apparatus comprising:
an interface unit; and
a processor configured to:

issue, via the interface unit, a browse action to one of the devices for obtaining an auxiliary component associated with a main component, wherein the auxiliary component includes audio data and caption data, wherein the caption data comprises location information of the caption data, type information of the caption data, identification information of the caption data and language information of the caption data, receive, via the interface unit, a browse response in response to the browse action, wherein the browse response includes the auxiliary component associated with the main component, and wherein the browse response further includes second access location information for accessing the audio data when the main component is configured to be played synchronously with the audio data, issue, via the interface unit, a connection preparation action to at least one device for the main component, receive, via the interface unit, a transmission identifier (ID) for identifying an instance of a transporting service of the main component, generate a first action including the received transmission ID, first access location information for accessing the main component, and the second access location information for accessing the audio data, issue, via the interface unit, the first action for setting both the first access location information for accessing the main component and the second access location information for accessing the audio data with the transmission ID to the at least one device, issue, via the interface unit, after the first action is issued, a single second action including the transmission ID, for requesting playback of the main component to the at least one device, wherein the main component accessed by the first access location information and the audio data accessed by the second access location information are played synchronously, and issue, via the interface unit, a third action to the at least one device to change the audio data, which is being played in synchronization with the main component according to the second action, to another audio data, wherein the audio data and the other audio data are related to the same main component.

8. The apparatus of claim 7, wherein the third action used for changing the audio data being played uses the same transmission ID included in the second action.

9. The apparatus of claim 7, wherein an action name of the second action is identical to that of an action used to set access location information for presentation of content associated with no auxiliary content to present synchronously.

10. The apparatus of claim 7, wherein the main component consists of AV data.

11. The apparatus of claim 7, wherein the second action is for setting together both the first access location information for accessing the main component and the second access location information for accessing the audio data.

12. The apparatus of claim 11, wherein the second action is for further setting access location information of a component, which contains synchronization data needed for synchronized presentation of the audio data, along with access location information of the main component.

* * * * *